United States Patent
Podrebarac (10) Patent No.: US 10,280,376 B2
(45) Date of Patent: May 7, 2019

(54) SELECTIVE HYDRODESULFURIZATION OF FCC GASOLINE TO BELOW 10 PPM SULFUR

(71) Applicant: Catalytic Distillation Technologies, The Woodlands, TX (US)

(72) Inventor: Gary G. Podrebarac, Pasadena, TX (US)

(73) Assignee: Catalytic Distillation Technologies, The Woodlands, TX (US)

( * ) Notice: Subject to any disclaimer, the term of this patent is extended or adjusted under 35 U.S.C. 154(b) by 143 days.

(21) Appl. No.: 15/496,918

(22) Filed: Apr. 25, 2017

(65) Prior Publication Data

US 2017/0226433 A1   Aug. 10, 2017

Related U.S. Application Data

(62) Division of application No. 13/968,553, filed on Aug. 16, 2013, now Pat. No. 9,631,149.

(Continued)

(51) Int. Cl.
*C10G 65/06* (2006.01)
*B01D 3/00* (2006.01)
(Continued)

(52) U.S. Cl.
CPC .............. *C10G 65/06* (2013.01); *B01D 3/009* (2013.01); *B01J 8/04* (2013.01); *C10G 45/02* (2013.01); *C10G 45/32* (2013.01); *C10G 65/00* (2013.01); *C10G 65/16* (2013.01); *C10G 2300/104* (2013.01); *C10G 2300/1044* (2013.01);
(Continued)

(58) Field of Classification Search
CPC ....... B01J 8/04; B01D 3/009; C10G 65/02–10
See application file for complete search history.

(56) References Cited

U.S. PATENT DOCUMENTS

| 6,495,030 B1 * | 12/2002 | Podrebarac | C10G 45/02 203/DIG. 6 |
|---|---|---|---|
| 2004/0178123 A1 * | 9/2004 | Podrebarac | C10G 67/06 208/211 |

(Continued)

OTHER PUBLICATIONS

Office Action issued in corresponding Canadian Application No. 2,883,131 dated Jul. 27, 2017(3 pages).

(Continued)

*Primary Examiner* — Renee Robinson
(74) *Attorney, Agent, or Firm* — Osha Liang LLP (57) ABSTRACT

A process for reducing the sulfur content of a hydrocarbon stream is disclosed. A full range cracked naphtha is contacted with a hydrogenation catalyst to convert at least a portion of the dienes and mercaptans to thioethers and to hydrogenate at least a portion of the dienes. The full range cracked naphtha is fractionated into a light naphtha fraction, a medium naphtha fraction, and a heavy naphtha fraction. The heavy naphtha fraction is hydrodesulfurized. The medium naphtha fraction is mixed with hydrogen and gas oil to form a mixture, which is contacted with a hydrodesulfurization catalyst to produce a medium naphtha fraction having a reduced sulfur concentration. The light, heavy, and medium naphtha fractions may then be recombined to form a hydrodesulfurized product having a sulfur content of less than 10 ppm in some embodiments.

15 Claims, 6 Drawing Sheets

Related U.S. Application Data

(60) Provisional application No. 61/691,452, filed on Aug. 21, 2012.

(51) Int. Cl.
    *B01J 8/04*     (2006.01)
    *C10G 45/02*     (2006.01)
    *C10G 45/32*     (2006.01)
    *C10G 65/00*     (2006.01)
    *C10G 65/16*     (2006.01)

(52) U.S. Cl.
    CPC ............... *C10G 2300/202* (2013.01); *C10G 2300/4087* (2013.01); *C10G 2400/02* (2013.01)

(56) References Cited

U.S. PATENT DOCUMENTS

| | | |
|---|---|---|
| 2004/0188327 A1 | 9/2004 | Groten |
| 2004/0195151 A1* | 10/2004 | Podrebarac ............ C10G 65/02 208/210 |
| 2008/0073250 A1* | 3/2008 | Bakshi .................. C10G 45/08 208/208 R |

OTHER PUBLICATIONS

Office Action issued in corresponding European Application No. 13830488.6 dated Nov. 16, 2018 (4 pages).

* cited by examiner

SELECTIVE HYDRODESULFURIZATION OF FCC GASOLINE TO BELOW 10 PPM SULFUR

CROSS-REFERENCE TO RELATED APPLICATIONS

This application, pursuant to 35 U.S.C. § 119(e), claims priority to U.S. Provisional Application Ser. No. 61/691,452, filed Aug. 21, 2012. This application, pursuant to 35 U.S.C. § 120, also claims benefit to U.S. patent application Ser. No. 13/968,553. Each of these applications is herein incorporated by reference in its entirety.

FIELD OF THE DISCLOSURE

Embodiments disclosed herein relate generally to a process for reducing the sulfur content of hydrocarbon streams. More specifically, embodiments disclosed herein relate to hydrodesulfurization processes that selectively reduce the sulfur content of FCC naphtha gasoline range feedstocks to below 10 ppm sulfur.

BACKGROUND

Petroleum distillate streams contain a variety of organic chemical components. Generally the streams are defined by their boiling ranges, which determine the composition. The processing of the streams also affects the composition. For instance, products from either catalytic cracking or thermal cracking processes contain high concentrations of olefinic materials as well as saturated (alkanes) materials and polyunsaturated materials (diolefins). Additionally, these components may be any of the various isomers of the compounds.

The composition of untreated naphtha as it comes from the crude still, or straight run naphtha, is primarily influenced by the crude source. Naphthas from paraffinic crude sources have more saturated straight chain or cyclic compounds. As a general rule most of the "sweet" (low sulfur) crudes and naphthas are paraffinic. The naphthenic crudes contain more unsaturates, cyclic, and polycylic compounds. The higher sulfur content crudes tend to be naphthenic. Treatment of the different straight run naphthas may be slightly different depending, upon their composition due to crude source.

Reformed naphtha or reformate generally requires no further treatment except perhaps distillation or solvent extraction for valuable aromatic product removal. Reformed naphthas have essentially no sulfur contaminants due to the severity of their pretreatment for the process and the process itself.

Cracked naphtha, as it comes from the catalytic cracker, has a relatively high octane number as a result of the olefinic and aromatic compounds contained therein. In some cases, this fraction may contribute as much as half of the gasoline in the refinery pool together with a significant portion of the octane.

Catalytically cracked naphtha gasoline boiling range material currently forms a significant part of the gasoline product pool in the United States and is the cause of the majority of the sulfur found in gasoline. These sulfur impurities may require removal in order to comply with product specifications or to ensure compliance with environmental regulations, which may be as low as 10, 20 or 50 wppm, depending upon the jurisdiction. For example, in the United States, Tier II gasoline regulations currently require refiners to achieve 50-60 ppm S in the FCC gasoline, which necessitates a conversion of approximately 90%-97% S. The EPA is now considering Tier III ultra-low sulfur gasoline regulations, requiring less than 10 ppm S. This will increase conversion requirements up to 98%-99.5%.

The most common method of removal of the sulfur compounds is by hydrodesulfurization (HDS) in which the petroleum distillate is passed over a solid particulate catalyst comprising a hydrogenation metal supported on an alumina base. Additionally, large amounts of hydrogen are included in the feed. The hydrodesulfurization reaction results in the production of hydrogen sulfide according to the following reaction: $RSH+H_2 \leftrightarrow R'+H_2S$. Typical operating conditions for standard single pass fixed bed HDS reactors, such as in a trickle bed reactor, are temperatures ranging from 600° F. to 780° F., pressures ranging from 600 to 3000 psig, hydrogen recycle rates ranging from 500 to 3000 scf/bbl, and fresh hydrogen makeup ranging from 100 to 1000 scf/bbl.

After the hydrotreating is complete, the product may be fractionated or simply flashed to release the hydrogen sulfide and collect the desulfurized naphtha. In addition to supplying high octane blending components the cracked naphthas are often used as sources of olefins in other processes such as etherifications, oligomerizations, and alkylations. The conditions used to hydrotreat the naphtha fraction to remove sulfur will also saturate some of the olefinic compounds in the fraction, reducing the octane and causing a loss of source olefins. Unfortunately, the operating severity required by existing units to achieve 10 ppm S will incur much higher octane losses. The loss of olefins by incidental hydrogenation at the severe conditions is detrimental, reducing the octane rating of the naphtha and reducing the pool of olefins for other uses.

Various proposals have been made for removing sulfur while retaining the more desirable olefins. Because the olefins in the cracked naphtha are mainly in the low boiling fraction of these naphthas and the sulfur containing impurities tend to be concentrated in the high boiling fraction, the most common solution has been prefractionation prior to intensive hydrotreating. The prefractionation produces a light boiling range naphtha which boils in the range of $C_5$ to about 150° F. and a heavy boiling range naphtha which boils in the range of from about 250-475° F.

Figure 1:
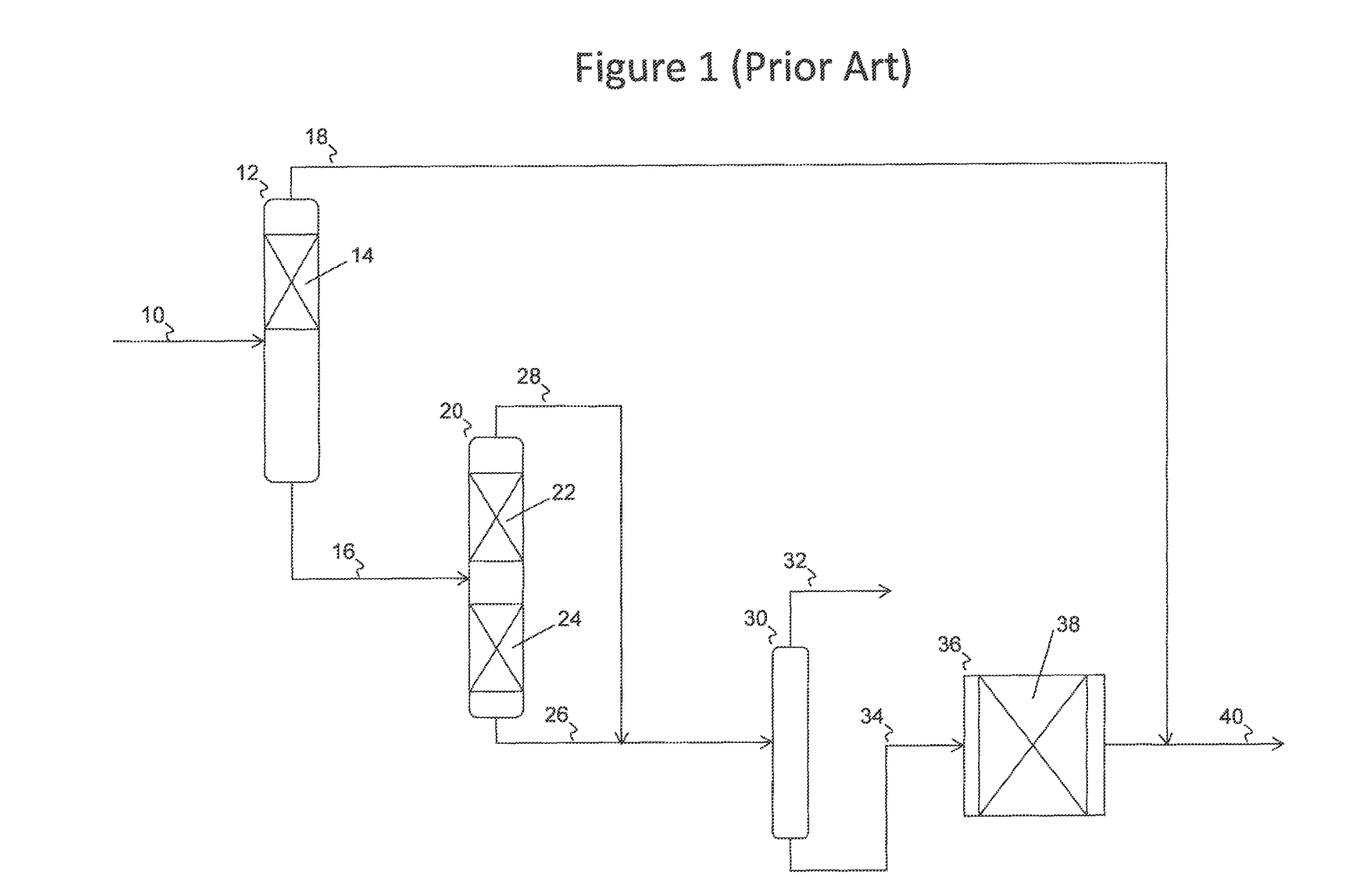
FIGS. 1 and 2 are simplified process flow diagrams illustrating prior art processes for hydrodesulfurizing a hydrocarbon feed.
Figure 2:
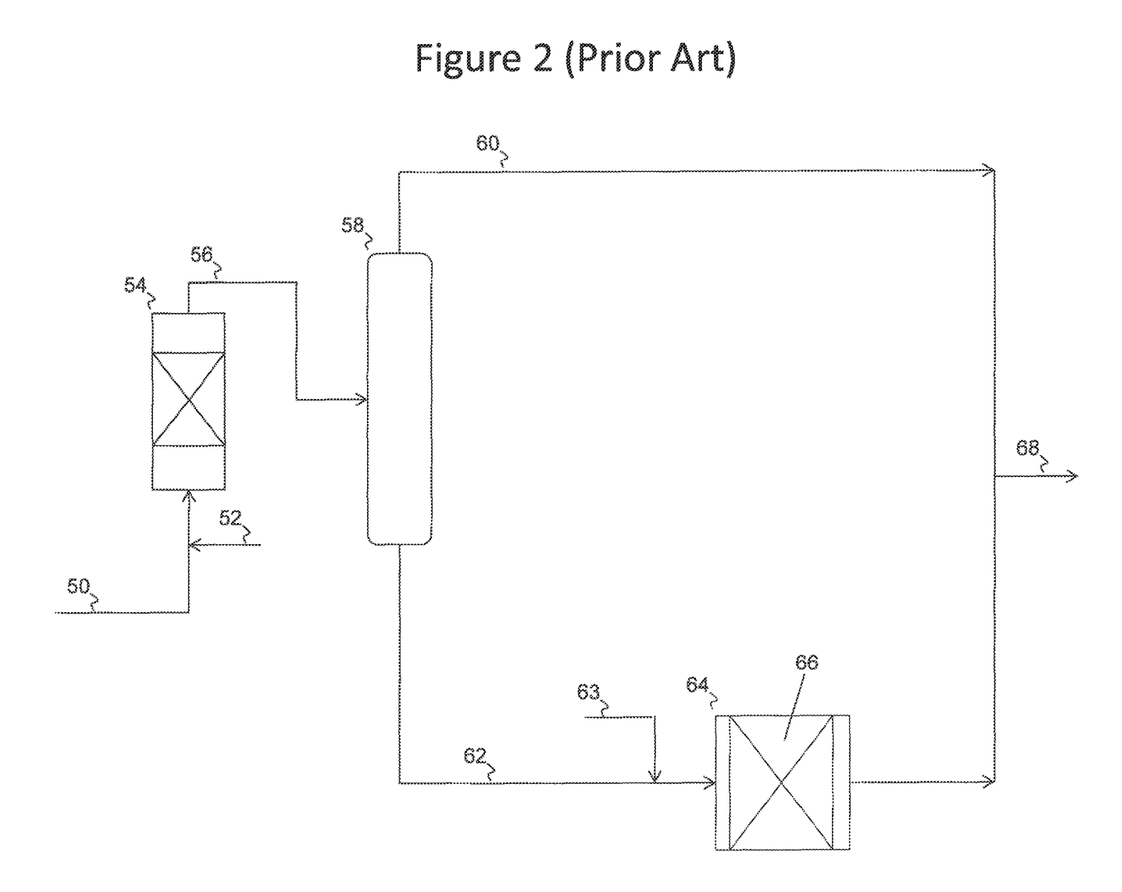

Two prior art methods that have been used to reduce the sulfur content of gasoline to 10 ppm are illustrated in FIGS. 1 and 2. The simplified process flow diagrams of FIGS. 1 and 2 illustrate major components of the process, and additional components may be present, such as pumps, heat exchangers, condensers, reboilers, hot drums, cold drums, etc., as would be understood by one skilled in the art.

Several U.S. Patents describe the concurrent distillation and desulfurization of naphtha, including U.S. Pat. Nos. 5,597,476; 5,779,883; 6,083,378; 6,303,020; 6,416,658; 6,444,118; 6,495,030 and 6,678,830. In each of these patents, the naphtha is split into two or three fractions based upon boiling point or boiling ranges. Two methods that have been used to reduce the sulfur content of gasoline to 10 ppm are illustrated in FIGS. 1 and 2. The simplified process flow diagrams of FIGS. 1 and 2 illustrate major components of the process, and additional components may be present, such as pumps, heat exchangers, condensers, reboilers, hot drums, cold drums, etc., as would be understood by one skilled in the art.

One such process is illustrated in FIG. 1. A full range cracked naphtha 10 is fed to a first catalytic distillation column 12 having a bed 14 containing a thioetherification catalyst in an upper portion of the column. The full range naphtha is fractionated to form a heavy fraction 16 (including medium cracked naphtha and heavy cracked naphtha) and a light fraction 18 (light cracked naphtha), and the dienes and mercaptans are reacted in bed 14 to produce thioethers, which are recovered with the heavy fraction. The heavy fraction 16 is then fed to a second catalytic distillation column 20, having beds 22, 24 containing hydrodesulfurization catalysts, where the medium and heavy cracked naphtha fractions are separated and hydrodesulfurized. The heavy and medium cracked naphthas, following desulfurization, are recovered as overheads and bottoms fractions 26, 28, respectively, fed to separator 30 to remove dissolved hydrogen sulfide 32, and then fed via flow line 34 to a fixed bed reactor 36 containing a bed 38 of hydrodesulfurization catalyst to react the heavy and medium naphtha fractions and further reduce the sulfur content of the combined fractions. To significantly reduce the sulfur content of the heavy and medium cracked naphtha fractions to meet a 10 ppm S specification, harsh conditions are generally required in reactor 36, which may result in significant losses of olefins and an undesirable loss in octane rating for the combined product 40.

As illustrated in FIG. 2, a full range cracked naphtha 50 and hydrogen 52 may be fed to a selective hydrogenation unit 54 to hydrogenate dienes and react mercaptans with dienes to form thioethers. The effluent 56 is then fed to a separator 58 to separate the full range cracked naphtha into a light cracked naphtha fraction 60 and a heavy fraction 62 (including medium and heavy cracked naphtha). Hydrogen 63 and heavy fraction 62 is then fed to a fixed bed reactor 64 containing a bed 66 of hydrodesulfurization catalyst to react the heavy and medium naphtha fractions and further reduce the sulfur content of the combined fractions. To significantly reduce the sulfur content of the heavy and medium cracked naphtha fractions to meet a 10 ppm S specification, harsh conditions are generally required in reactor 64, which may result in significant losses of olefins and an undesirable loss in octane rating for the combined product 68.

SUMMARY OF THE DISCLOSURE

Embodiments disclosed herein relate to processes for selectively reducing the sulfur content of gasoline to 10 ppm or less. The "selective" processes herein may reduce the sulfur content to meet the very low sulfur specifications while preserving a significant amount of olefins and maintaining a high octane rating for the product.

In one aspect, embodiments disclosed herein relate to a process for reducing the sulfur content of a hydrocarbon stream. The process may include: contacting a full range cracked naphtha with a hydrogenation catalyst to convert at least a portion of the dienes and mercaptans to thioethers and to hydrogenate at least a portion of the dienes; fractionating the full range cracked naphtha into a light naphtha fraction, a medium naphtha fraction, and a heavy naphtha fraction; hydrodesulfurizing the heavy naphtha fraction; mixing the medium naphtha fraction with hydrogen and a gas oil to form a mixture; contacting the mixture with a hydrodesulfurization catalyst in a hydrodesulfurization reactor to produce a reactor effluent comprising hydrogen sulfide, unreacted hydrogen, and a medium naphtha fraction having a reduced sulfur concentration; and separating the medium naphtha fraction having a reduced sulfur concentration from the gas oil, the unreacted hydrogen, and hydrogen sulfide.

In another aspect, embodiments disclosed herein relate to a system for reducing the sulfur content of a hydrocarbon stream to less than about 10 ppm. The system may include: a hydrogenation reactor for contacting a full range cracked naphtha with a hydrogenation catalyst to convert at least a portion of the dienes and mercaptans to thioethers and to hydrogenate at least a portion of the dienes; a separation system for fractionating the full range cracked naphtha into a light naphtha fraction, a medium naphtha fraction, and a heavy naphtha fraction; a hydrodesulfurization reactor for hydrodesulfurizing the heavy naphtha fraction; a mixing device for mixing the medium naphtha fraction with hydrogen and a gas oil to form a mixture; a hydrodesulfurization reactor for contacting the mixture with a hydrodesulfurization catalyst to produce a reactor effluent comprising hydrogen sulfide, unreacted hydrogen, and a medium naphtha fraction having a reduced sulfur concentration; a separation system for separating the medium naphtha fraction having a reduced sulfur concentration from the gas oil, the unreacted hydrogen, and hydrogen sulfide.

In another aspect, embodiments disclosed herein relate to a process for a process for reducing the sulfur content of a hydrocarbon stream. The process may include: contacting a full range cracked naphtha with a hydrogenation catalyst to convert at least a portion of the dienes and mercaptans to thioethers and to hydrogenate at least a portion of the dienes; fractionating the full range cracked naphtha into: a light naphtha fraction having a boiling range end point in the range from about 120° F. to about 190° F. and a sulfur content of less than about 15 ppm, a medium naphtha fraction having a boiling range, end point temperature minus initial boiling point temperature, of less than 150° F., and a heavy naphtha fraction having an initial boiling point in the range from about 230° F. to about 270° F.; hydrodesulfurizing the heavy naphtha fraction to produce a hydrodesulfurized heavy naphtha fraction has a sulfur content of less than about 12 ppm; mixing the medium naphtha fraction with hydrogen and a gas oil to form a mixture; heating the mixture; contacting the heated mixture with a hydrodesulfurization catalyst in a hydrodesulfurization reactor to produce a reactor effluent comprising hydrogen sulfide, unreacted hydrogen, and a medium naphtha fraction having a reduced sulfur concentration; separating the medium naphtha fraction having a reduced sulfur concentration from the gas oil, the unreacted hydrogen, and hydrogen sulfide to produce a medium naphtha fraction having a reduced sulfur concentration has a sulfur content of less than about 5 ppm; mixing the light naphtha fraction, the medium naphtha fraction having a reduced sulfur concentration, and the hydrodesulfurized heavy naphtha fraction to produce a full range naphtha product having a sulfur content of equal to or less than about 10 ppm.

Other aspects and advantages will be apparent from the following description and the appended claims.

DETAILED DESCRIPTION

Embodiments disclosed herein relate generally to a process for reducing the sulfur content of hydrocarbon streams. More specifically, embodiments disclosed herein relate to hydrodesulfurization processes that selectively reduce the sulfur content of FCC naphtha gasoline range feedstocks to below 10 ppm sulfur. The "selective" processes herein may reduce the sulfur content to meet the very low sulfur specifications while preserving a significant amount of olefins and maintaining a high octane rating for the product.

Within the scope of this application, the expression "catalytic distillation reactor system" denotes an apparatus in which the catalytic reaction and the separation of the products take place at least partially simultaneously. The apparatus may comprise a conventional catalytic distillation column reactor, where the reaction and distillation are concurrently taking place at boiling point conditions, or a distillation column combined with at least one side reactor, where the side reactor may be operated as a liquid phase reactor or a boiling point reactor. While both catalytic distillation reactor systems described may be preferred over conventional liquid phase reaction followed by separations, a catalytic distillation column reactor may have the advantages of decreased piece count, reduced capital cost, efficient heat removal (heat of reaction may be absorbed into the heat of vaporization of the mixture), and a potential for shifting equilibrium. Divided wall distillation columns, where at least one section of the divided wall column contains a catalytic distillation structure, may also be used, and are considered "catalytic distillation reactor systems" herein.

The hydrocarbon feed to the processes disclosed herein may be a sulfur-containing petroleum fraction which boils in the gasoline boiling range, including FCC gasoline, coker pentane/hexane, coker naphtha, FCC naphtha, straight run gasoline, pyrolysis gasoline, and mixtures containing two or more of these streams. Such gasoline blending streams typically have a normal boiling point within the range of 0° C. and 260° C., as determined by an ASTM D86 distillation (used with respect to boiling points and boiling ranges disclosed herein). Feeds of this type include light naphthas typically having a boiling range of about $C_6$ to 165° C. (330° F.); full range naphthas, typically having a boiling range of about $C_5$ to 215° C. (420° F.), heavier naphtha fractions boiling in the range of about 125° C. to 210° C. (260° F. to 412° F.), or heavy gasoline fractions boiling in the range of about 165° C. to 260° C. (330° F. to 500° F.). In general, a gasoline fuel will distill over the range of from about room temperature to 260° C. (500° F.).

Organic sulfur compounds present in these gasoline fractions occur principally as mercaptans, aromatic heterocyclic compounds, and disulfides. Relative amounts of each depend on a number of factors, many of which are refinery, process and feed specific. In general, heavier fractions contain a larger amount of sulfur compounds, and a larger fraction of these sulfur compounds are in the form of aromatic heterocyclic compounds. In addition, certain streams commonly blended for gasoline, such as FCC feedstocks, contain high amounts of the heterocyclic compounds. Gasoline streams containing significant amounts of these heterocyclic compounds are often difficult to process using many of the prior art methods. Very severe operating conditions have been conventionally specified for hydrotreating processes to desulfurize gasoline streams, resulting in a large octane penalty. Adsorption processes, used as an alternative to hydrogen processing, have very low removal efficiencies, since the aromatic heterocyclic sulfur compounds have adsorptive properties similar to the aromatic compounds in the hydrocarbon matrix.

Aromatic heterocyclic compounds that may be removed by the processes disclosed herein include alkyl substituted thiophene, thiophenol, alkylthiophene and benzothiophene. Among the aromatic heterocyclic compounds of particular interest are thiophene, 2-methylthiophene, 3-methylthiophene, 2-ethyithiophene, benzothiophene and methylbenzothiophene. These aromatic heterocyclic compounds are collectively termed "thiophenes." Mercaptans that may be removed by the processes described herein often contain from 2-10 carbon atoms, and are illustrated by materials such as 1-ethanthiol, 2-propanethiol, 2-butanethiol, 2-methyl-2-propanethiol, pentanethiol, hexanethiol, heptanethiol, octanethiol, nonanethiol, and thiophenol.

In general, gasoline streams suited for treatment using the processes disclosed herein contain greater than about 10 ppm thiophenic compounds. Typically, streams containing more than 40 ppm thiophenic compounds, such as up to 2000 ppm thiophenic compounds and higher, may be treated using the processes as described herein. The total sulfur content of the gasoline stream to be treated using the processes disclosed herein will generally exceed 50 ppm by weight, and typically range from about 150 ppm to as much as several thousand ppm sulfur. For fractions containing at least 5 volume percent boiling over about 380° F. (over about 193° C.), the sulfur content may exceed about 1000 ppm by weight, and may be as high as 4000 to 7000 ppm by weight or even higher.

In addition to the sulfur compounds, naphtha feeds, including FCC naphtha, may include paraffins, naphthenes, and aromatics, as well as open-chain and cyclic olefins, dienes, and cyclic hydrocarbons with olefinic side chains. A cracked naphtha feed useful in the processes described herein may have an overall olefins concentration ranging from about 5 to 60 weight percent in some embodiments; from about 25 to 50 weight percent in other embodiments.

Catalysts useful as the hydrodesulfurization catalyst in reaction zones of embodiments herein may include Group VIII metals, such as cobalt, nickel, palladium, alone or in combination with other metals, such as molybdenum or tungsten, on a suitable support, which may be alumina, silica-alumina, titania-zirconia or the like. The hydrodesulfurization catalysts may also contain components from Groups VB and VIB of the Periodic Table or mixtures thereof. Catalysts containing a Group VIB metal, such as molybdenum, and a Group VIII metal, such as cobalt or nickel, are preferred. Catalysts suitable for the hydrodesulfurization reaction include cobalt-molybdenum nickel-molybdenum and nickel-tungsten. The metals are generally present as oxides supported on a neutral base such as alumina, silica-alumina or the like. The metals are reduced to the sulfide either in use or prior to use by exposure to sulfur compound containing streams and hydrogen.

The catalyst may also catalyze the hydrogenation of the olefins contained within the light cracked naphtha and the isomerization of some of the mono-olefins. The hydrogenation, especially of the mono-olefins in the lighter fraction, may not be desirable.

After treatment according to the processes described herein, the sulfur content of the treated stream may be less than about 15 ppm in some embodiments; less than 10 ppm in other embodiments; less than 8 ppm in other embodiments; less than 5 ppm in yet other embodiments, where each of the above are based on weight.

Figure 3:
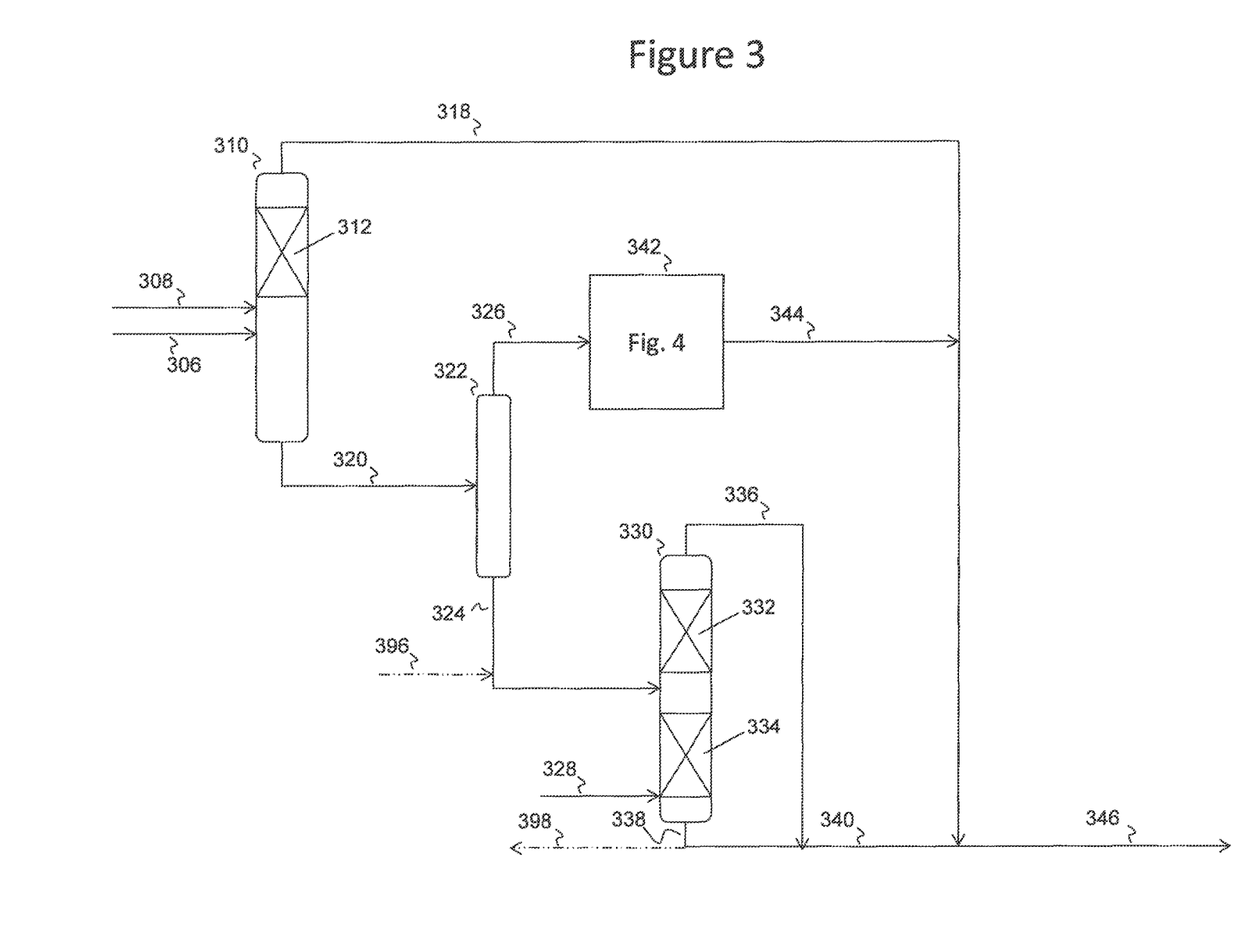
FIGS. 3-6 are simplified process flow diagrams illustrating processes for hydrodesulfurizing a hydrocarbon feed according to embodiments disclosed herein.

Referring now to FIG. 3, a simplified process flow diagram of one embodiment of the hydrodesulfurization processes disclosed herein is illustrated. Hydrogen and a full range cracked naphtha or other sulfur-containing hydrocarbon feed may be fed via flow lines 306, 308 to a catalytic distillation reactor system 310 having one or more reactive distillation zones 312 for hydrotreating the hydrocarbon feed. As illustrated, catalytic distillation reactor system 310 includes at least one reactive distillation zone 312, located in an upper portion of the column 310, above the feed inlet, for treating the light hydrocarbon components in the feed.

Reaction zone 312 may include one or more catalysts for the hydrogenation of dienes, reaction of mercaptans and dienes (thioetherification), hydroisomerization, and hydrodesulfurization. For example, conditions in the first catalytic distillation reactor system 310 may provide for thioetherification and/or hydrogenation of dienes and removal of mercaptan sulfur from the $C_5/C_6$ portion of the hydrocarbon feed.

An overheads fraction may be recovered from catalytic distillation reactor system 310 via flow line 318, and may contain light hydrocarbons and unreacted hydrogen. Catalytic distillation reactor system 310 has an overhead system (not illustrated) for separating the hydrogen sulfide and unreacted hydrogen from the light naphtha portion of the feed, and may include hot drums, cold drums, heat exchangers, pumps, and other equipment as known to those skilled in the art. In some embodiments, the light naphtha portion of the feed condensed in the overhead system may be fed back to column 310 as a total reflux, and the light naphtha portion of the feed may be recovered from catalytic distillation reactor system 30 as a side draw product.

Higher boiling components, such as the medium and heavy naphtha portions of the hydrocarbon feed, as well as any thioethers formed in reaction zone 312 and various other sulfur compounds contained in the hydrocarbon feed, traverse downward through the column, and may be recovered as a bottoms fraction via flow line 320. Catalytic distillation reactor system 310 also has a reboiler system (not illustrated), for maintaining temperature control and vapor/liquid traffic within column 310.

Operating conditions in column 310 are selected to ensure that thiophene, which has a boiling point of about 180° F., is recovered with the bottoms fraction 320. Due to entrainment and other distillation effects, it may be desirable to operate column 310 at an overhead temperature in the range from about 120° F. to about 190° F. in some embodiments, and in the range from about 140° F. to about 165° F. in other embodiments, such as about 150° F. For example, the boiling range end point of the overheads fraction may be in the range from about 140° F. to about 150° F., and may represent from about 15 wt. % to about 30 wt. %, such as about 25 wt. %, of the full range cracked naphtha feed. Under these conditions, the destruction of sulfur species and formation of thioethers may result in an overheads fraction 318 containing less than 15 ppm sulfur, such as about 10 ppm sulfur.

Bottoms fraction 320 is then fed to a naphtha splitter 322, where the medium and heavy naphtha portions of the feed are separated. The heavy portion of the feed may be recovered as a bottoms fraction via flow line 324 and the medium naphtha may be recovered as an overheads fraction via flow line 326.

Splitter 322 may be operated to result in a medium cracked naphtha fraction having a boiling range differential (end point minus start point) in the range from about 80° F. to about 150° F., such as in the range from about 90° F. to about 120° F., for example about 100° F. to about 105° F. For example, the medium cracked naphtha may have a boiling range having a start point of about 140° F. to about 150° F. and an end point in the range from about 230° F. to about 220° F. or 280° F., such as a boiling range from about 150° F. to about 230° F. Such a boiling range will encompass the boiling point of thiophene and methyl thiophene to hydrocarbons boiling approximately 100° F. greater than thiophene. The medium cracked naphtha may represent from about 10 wt. % to about 25 wt. %, such as about 15 wt. % to about 20 wt. %, of the full range cracked naphtha feed.

The heavy cracked naphtha recovered via flow line 324 may thus include hydrocarbons boiling at a temperature of greater than about 230° F. is some embodiments, greater than 250° F. in other embodiments, and greater than about 270° F. in yet other embodiments. The initial boiling point of the heavy naphtha fraction may depend upon the boiling range of the medium cracked naphtha fraction, and may represent from about 50 wt. % to about 65 wt. % of the full range cracked naphtha feed, such as about 55 wt. % to about 60 wt. % of the full range feed.

Bottoms fraction 324 and hydrogen 328 may then be fed to catalytic distillation reactor system 330 containing one or more reaction zones for hydrotreating the heavy naphtha fraction. As illustrated, catalytic distillation reactor system 330 includes an upper reaction zone 332 and a lower reaction zone 334, each containing a hydrodesulfurization catalyst, which may be the same or different. A portion of the heavy naphtha is boiled up into reaction zone 332, where sulfur containing species react with hydrogen to form hydrogen sulfide. The heavier portion of the heavy naphtha feed traverses downward through reaction zone 334, the sulfur containing species reacting with hydrogen to form hydrogen sulfide. Hydrogen sulfide from both reaction zones and the lighter portion of the heavy naphtha feed are recovered as an overheads fraction via flow line 336, and the heavier portion of the heavy naphtha feed is recovered as a bottoms fraction via flow line 338. Catalytic distillation reactor system 330 has an overhead system (not illustrated) for separating the hydrogen sulfide and unreacted hydrogen from the light naphtha portion of the feed, and may include hot drums, cold drums, heat exchangers, pumps, and other equipment as known to those skilled in the art. Catalytic distillation reactor system 330 also has a reboiler system (not illustrated), for maintaining temperature control and vapor/liquid traffic within column 330, and may also include flash drums or other components to remove dissolved hydrogen and/or hydrogen sulfide from the bottoms fraction.

The overall conditions in catalytic distillation reactor system 330 should be selected appropriately for the boiling range of the heavy cracked naphtha feed and to achieve the desired sulfur reduction. Catalytic distillation reactor system 330 may be operated at a bottoms temperature of less than about 680° F., such as in the range from about 650° F. to about 680° F. Column pressures may be adjusted to limit the temperature required in the reboiler. Conditions in catalytic distillation reactor system 330 may be selected such that the combined effluent 340 may have a sulfur content in the range from about 10 to about 15 ppm sulfur, such as about 12 ppm sulfur.

The heavy naphtha fractions, both overheads and bottoms, following separation from hydrogen sulfide and unreacted hydrogen, may then be mixed to form a heavy naphtha fraction having a reduced sulfur content, flow stream 340. In some embodiments, the overheads and bottoms fractions may be co-processed in a condensation/separation system to separate the hydrocarbons from hydrogen and hydrogen sulfide and to recover the mixed heavy naphtha fractions.

Overheads fraction 326 is fed to a selective hydrodesulfurization unit 342, described with respect to FIG. 4 below, for selective hydrotreatment of the medium cracked naphtha portion of feed 308. Following hydrotreatment in selective hydrodesulfurization unit 342, a medium cracked naphtha fraction having a reduced sulfur content is recovered via flow line 344.

The treated fractions, light naphtha fraction in flow line 318, the medium naphtha fraction in flow line 344, and the heavy naphtha fraction in flow line 340, each having a reduced sulfur content as compared to the respective portions of the feed, may then be combined to form a hydrodesulfurized naphtha 346.

Figure 4:
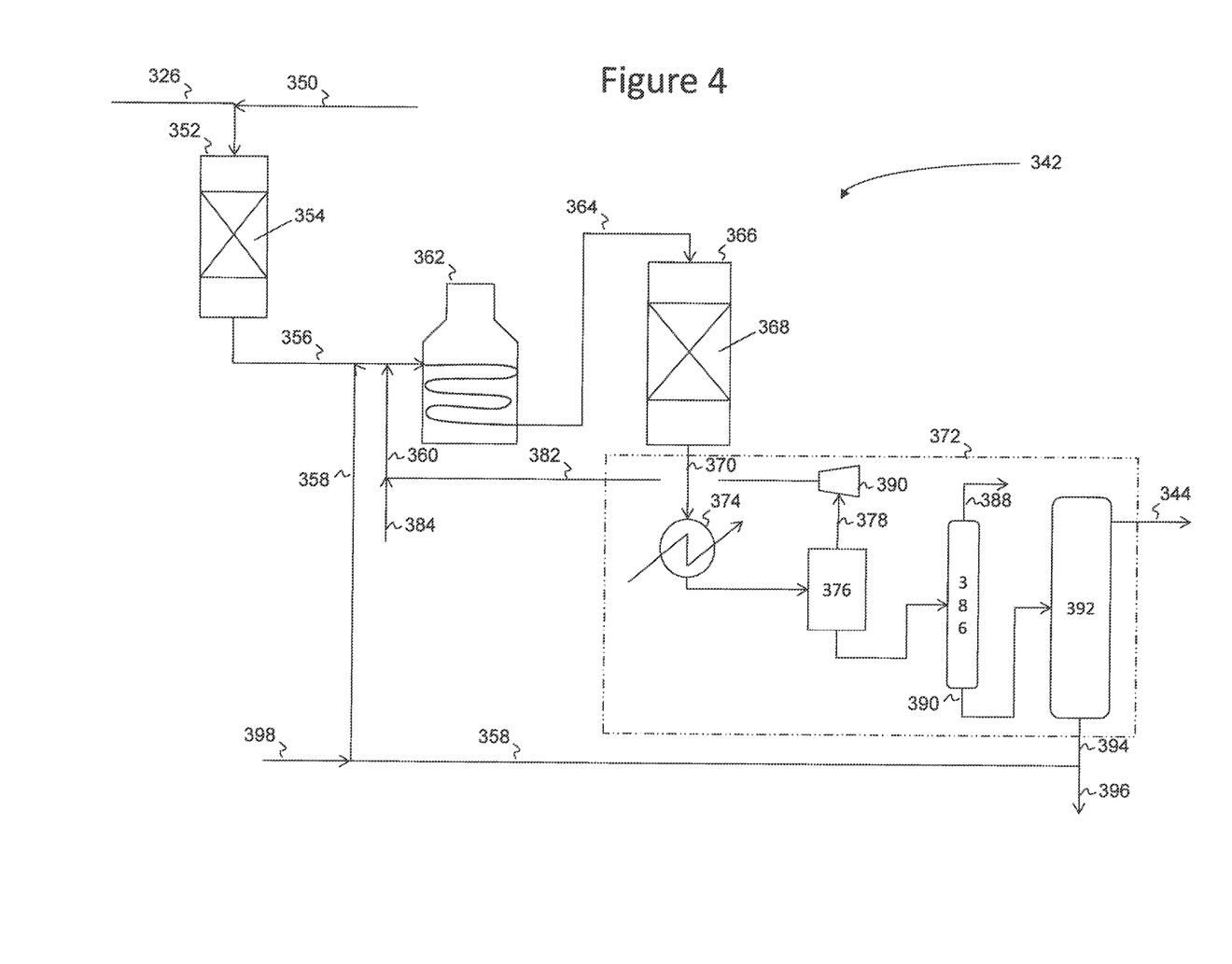

Referring now to FIG. 4, selective hydrodesulfurization system 342 is illustrated. Medium naphtha fraction 326 may be fed along with hydrogen 350 to a fixed bed reactor 352 including a reaction zone 354 containing a selective hydrogenation catalyst. In reaction zone 354, hydrogen and dienes in the medium cracked naphtha fraction are reacted to form olefins and paraffins. The effluent from reactor 352 may be recovered via flow line 356.

Effluent 356, having a reduced diene content, may then be mixed with a heavy oil fraction 358 and hydrogen 360. The combined feeds are then heated via indirect heat exchange, such as in exchanger 362. Heated feed stream 364 is then fed to fixed bed reactor 366 including a reaction zone 368 containing a hydrodesulfurization catalyst. In reaction zone 368, sulfur containing species are reacted with hydrogen to form hydrogen sulfide.

The effluent from reactor 366 may be recovered via flow line 370, and fed to a separation zone 372 for separation of unreacted hydrogen and hydrogen sulfide from the hydrocarbons and to separate the heavy oil fraction from the medium cracked naphtha fraction. As illustrated, the effluent in flow line 370 may be cooled via indirect heat exchange in exchanger 374 and fed to separator 376, which may be a flash drum or a fractionation tower, for example. In separator 376, unreacted hydrogen may be recovered as a vapor fraction 378, compressed via compressor 380, and recycled via flow line 382 for admixture with fresh hydrogen feed 384 to form hydrogen feed 360. The liquid fraction recovered from separator 376 may then be fed to a fractionation column 386 to separate any dissolved hydrogen and hydrogen sulfide, recovered as an overheads stream 388, from the medium cracked naphtha and heavy oil fractions, recovered as a bottoms stream 390.

Stream 390 may then be fed to a fractionation column 392 to separate the medium cracked naphtha fraction from the heavy oil fraction. The medium cracked naphtha fraction may be recovered from fractionation column 392 as an overheads fraction, or as illustrated, a side draw, where the overheads system (not illustrated) of the column includes a total liquid reflux, allowing any additional dissolved hydrogen sulfide to be removed from the medium naphtha product fraction 344. The heavy oil fraction may be recovered as a bottoms 394, the majority of which may be recycled via flow line 358 for reuse as described above. The remainder of the heavy oil fraction may be recovered as a purge stream 396, and fresh oil may be added via flow stream 398, as necessary.

As with any hydrodesulfurization process, recombinant mercaptans may form in separation zone 372, as well as in reactor 366. However, as formation of the mercaptans increases the boiling point of the resultant compound by about 130° F., any recombinant mercaptans formed in the separation zone 372 will be recovered with the oil fraction in bottoms stream 394. Such mercaptans may be circulated via flow lines 358 (and 396 if fed to HCN reactor) to eventual destruction or purged from the system via flow line 396. Thus, recombinant mercaptans do not negatively impact the overall hydrodesulfurization results in the selective hydrodesulfurization system 342, permitting recovery of a medium cracked naphtha fraction having a very low sulfur content, such as about 1 ppm.

Reactor 366 may be a standard downflow trickle bed reactor, and may be operated at a temperature sufficient to convert a majority of the organic sulfur compounds in the medium cracked naphtha fraction to hydrogen sulfide. In some embodiments, the heavy oil fraction may be a gas oil, such as a diesel oil, a heavy cracked naphtha fraction, or other heavy hydrocarbon fractions having a boiling range end point temperature greater than the temperature at which reactor 366 is operated. The gas oil diluent may serve to maintain the catalyst as wetted, remaining two-phase under hydrodesulfurization conditions. The gas oil also dilutes the medium cracked naphtha feed, thereby minimizing reaction of olefins and reducing the temperature rise across the reactor. In this manner, the olefins content of the medium cracked naphtha fraction is not greatly diminished while the sulfur content is significantly reduced.

Referring again to FIG. 3, in some embodiments a portion of the heavy naphtha fraction recovered via bottoms stream 338 may be fed via flow line 398 for use in selective hydrodesulfurization system 342 as the heavy oil fraction 358 or a portion thereof, or as a make-up gas oil stream. Purge stream 396, being a heavy naphtha fraction, may also be combined with heavy naphtha fraction 324 for feed to column 330. In this manner, the heavy oil fraction is supplied and processed internal to the overall hydrodesulfurization system, negating the need for external heavy oil feed sources. Although the heavy oil as discussed above may be internal to the process, external heavy oil feeds may also be used, alone or in conjunction with the process streams noted above.

Reactor 366 may be operated at temperatures in the range of about 480° F. to about 700° F., such as in the range from about 525° F. to about 675° F. in some embodiments, and greater than about 600° F. in yet other embodiments. The pressure in the reactor is fairly low, such as less than about 300 psig, with hydrogen partial pressures in the range from about 40 to about 150 psi. The gas oil fraction may be present in the mixture with the medium cracked naphtha at a volume ratio in the range from about 0.5:1 to about 5:1, such as from about 0.75:1 to about 2:1 or 1:1 to about 1.5:1. The overall results of the reaction and separation in the selective hydrodesulfurization system 342 may reduce the sulfur content of the medium cracked naphtha to less than 5 ppm. In some embodiments, the sulfur content of the medium cracked naphtha may be reduced to less than 2 ppm or even less than 1 ppm. In some embodiments, selective hydrodesulfurization system 342 may reduce the sulfur content of the medium cracked naphtha by about 99.5% or greater while incurring less than 30% olefin losses, for example.

As noted above, the boiling range of the medium cracked naphtha is limited to about 100° F.; increasing the boiling range of the medium cracked naphtha significantly greater than about 100° F. or 120° F. may result in introduction of hindered sulfur species into selective hydrodesulfurization system 342, such as benzothiophene and methylbenzothiophene, negatively impacting the overall sulfur reduction that may be achieved in system 342. It is thus beneficial to limit the boiling range of the medium cracked naphtha, resulting in feed of the hindered sulfur species to column 330, which operates under harsher conditions conducive to sulfur removal in such compounds.

Overall, as described above, the light cracked naphtha product may have a sulfur content of about 10 ppm, and may represent about 25 wt. % of the full range cracked naphtha feed. The medium cracked naphtha product may have a sulfur content of about 1 ppm, and may represent about 15 wt. % of the full range cracked naphtha feed. The heavy cracked naphtha product may have a sulfur content of about 12 ppm, and may represent about 60 wt. % of the full range cracked naphtha feed. Thus, the combined product stream 346 may have a sulfur content of less than about 10 ppm (0.6*12+0.15*1+0.25*10=9.85 ppm sulfur). The sulfur content of the combined product 346 may vary depending upon the overall feed composition, the boiling ranges selected for the respective fractions, and the conditions used to treat each of the fractions; however, the process of FIG. 3 may readily be used to result in a full range cracked naphtha product having a sulfur content of 10 ppm or less, even where the sulfur content of the heavy cracked naphtha product fraction has a sulfur content of greater than 10 ppm.

As illustrated by the above example compositions and results, the hydrodesulfurization of the heavy cracked naphtha has the greatest impact on the final product sulfur content, as being the largest fraction (typically greater than 50% of the feed). Should a further decrease in the sulfur content of the heavy cracked naphtha fraction be desired, heavy cracked naphtha stream 340 may additionally be processed in a polishing reactor at elevated temperatures to result in a heavy cracked naphtha product having a sulfur content in the range from about 5 ppm to about 10 ppm.

Figure 5:
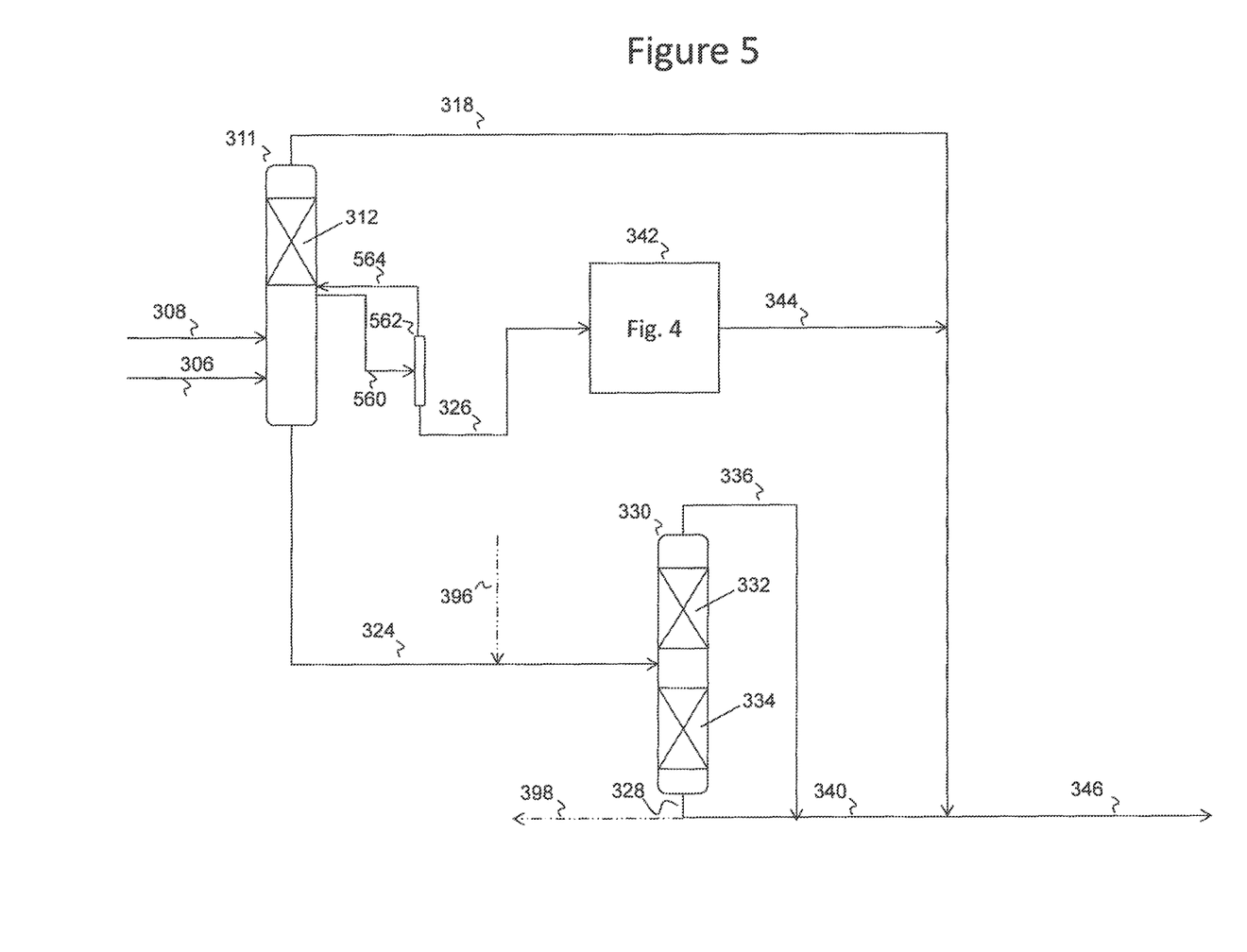

Referring now to FIG. 5, a simplified process flow diagram of one embodiment of the hydrodesulfurization processes disclosed herein is illustrated, where like numerals represent like parts. In this embodiment, the function of catalytic distillation reactor system 310 and splitter 322 (FIG. 3) are combined in a single catalytic distillation reactor system 311, where the medium cracked naphtha fraction 560 is withdrawn as a side draw and the heavy cracked naphtha fraction 324 is withdrawn as a bottoms fraction. As it is desired to control the boiling range of the medium cracked naphtha fed to selective hydrodesulfurization system 342, the side draw 560 may be initially fed to a side stripper 562. Light hydrocarbons and any dissolved hydrogen or hydrogen sulfide may be recovered as a vapor fraction and returned to catalytic distillation reactor system 311 via flow line 564, and the medium cracked naphtha, having a desired initial boiling point and/or boiling point range, may be recovered via flow line 326 for continued processing. The remaining streams are processed as described above with respect to FIGS. 3 and 4. Conditions in column 311 and location of the side draw and feed should be selected to achieve the desired boiling ranges of the fractions as described above and to limit the introduction of heavy sulfur species into the medium cracked naphtha fraction. As illustrated in FIG. 5, in some embodiments it may be desirable to locate the side draw above the feed location.

As compared to the arrangement of FIG. 1, the process of FIG. 3 introduces a smaller amount of feed to the hydrodesulfurization catalytic distillation reaction system (column 330 of FIG. 3 versus column 20 of FIG. 1), primarily due to the separate processing of the medium cracked naphtha fraction. This also removes a significant amount of olefins from the column feed, reducing olefin losses; further, as olefins are known to inhibit the hydrodesulfurization reaction, the lower concentration of olefins in the feed may result in increased hydrodesulfurization efficiency. The reduced feed may also result in an increase in residence time in the column, decreasing space velocity. This may provide for an increase in sulfur conversion at similar operating temperatures. However, due to changes in operating conditions of the column, such as an increased bottoms temperature and/or higher upper reaction zone temperatures, the overall conversion in the column may be increased. This synergistic effect, due to the allowed increase in temperatures and reduction in space velocity, as well as the reduced olefin concentration in the feed to column 330 allows the sulfur content in the combined column product stream 340 to be reduced to the above noted ranges, such as about 10 ppm to about 12 ppm sulfur.

Figure 6:
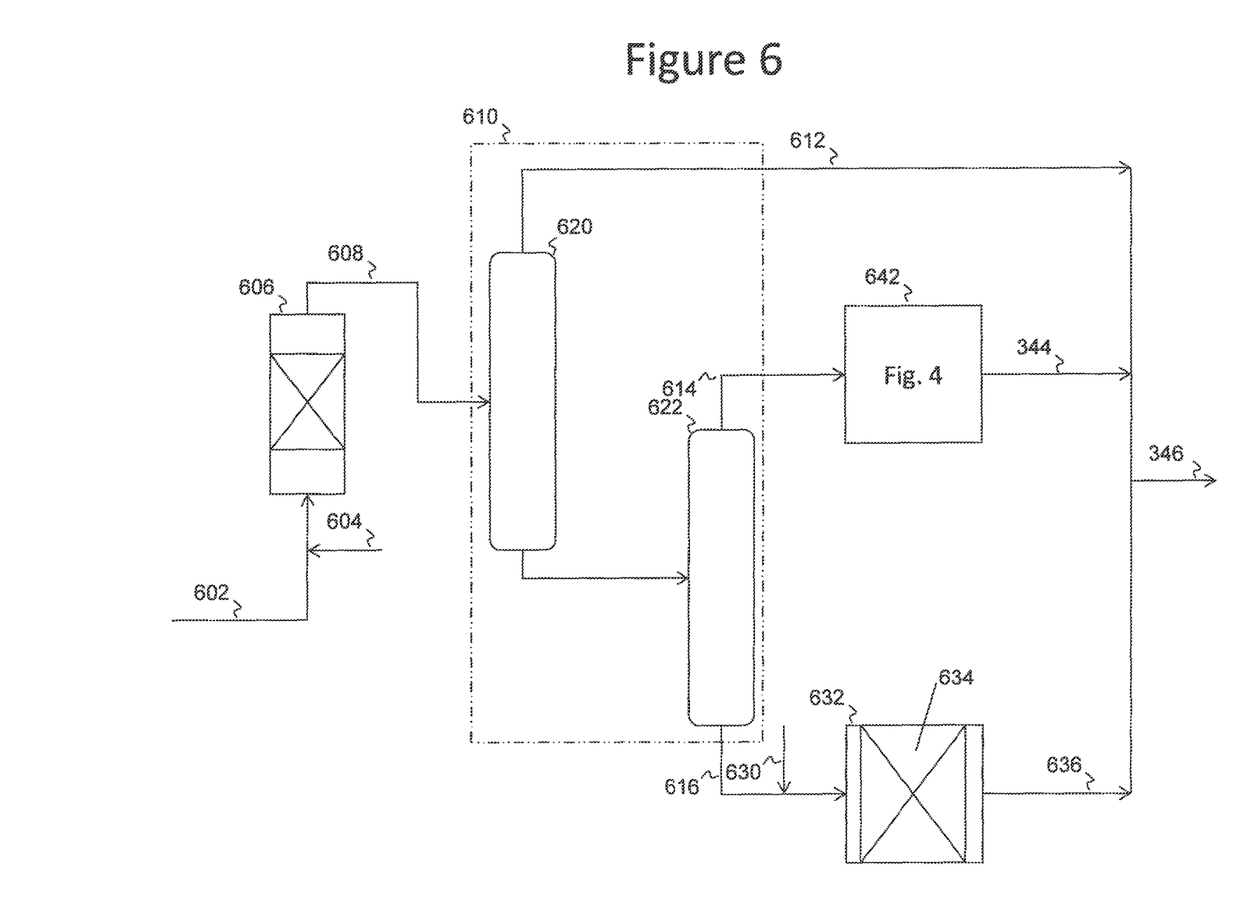

Referring now to FIG. 6, a simplified process flow diagram of one embodiment of the hydrodesulfurization processes disclosed herein is illustrated. In this embodiment, a full range cracked naphtha 602 and hydrogen 604 may be fed to a selective hydrogenation unit 606 to hydrogenate dienes and react mercaptans. The effluent 608 is then fed to a separation system 610, which may include one or more fractionation columns for separating the effluent 608 into a light cracked naphtha fraction 612, a medium cracked naphtha fraction 614, and a heavy cracked naphtha fraction 616. As illustrated, separation system 610 may include two fractionation columns 620, 622, where column 620 may be used to separate the light cracked naphtha from the medium and heavy cracked naphtha fractions and column 622 may be used to separate the medium and heavy cracked naphtha fractions. Alternatively, a single column with a side draw may be used. The boiling ranges for fractions 612, 614, and 616 should be similar to those as described above with respect to FIG. 3. Hydrogen 630 and heavy fraction 616 are then fed to a fixed bed reactor 632 containing a bed 634 of hydrodesulfurization catalyst to reduce the sulfur content of the heavy naphtha fraction, resulting in a heavy cracked naphtha product 636 (following separation of hydrogen and hydrogen sulfide).

The medium cracked naphtha fraction 614 may be processed in a selective hydrodesulfurization system 642, similar to that as describe above with respect to FIG. 4, to produce a medium cracked naphtha product 344 having a reduced sulfur content. However, due to the full feed being processed in selective hydrogenation reactor 606, medium cracked naphtha fraction 614 may be mixed with hydrogen and gas oil and fed directly to heater 362 (reactor 352 is not necessary with the embodiment of FIG. 6 as the dienes in the medium cracked naphtha are reduced in reactor 606, whereas a majority of the medium cracked naphtha bypasses reaction zone 312 in the embodiment of FIG. 3).

As compared to the arrangement of FIG. 2, the process of FIG. 6 introduces a lesser amount of feed to the fixed bed hydrodesulfurization reactor (reactor 632 versus reactor 66). Similar to the results discussed above with respect to the heavy cracked naphtha catalytic distillation reactor system, separate processing of the medium cracked naphtha may result in a lower olefin concentration being fed to the reactor, as well as an increased residence time and decreased space velocity in reactor 632, allowing reduction of the sulfur content of the heavy cracked naphtha product to 10 ppm to 12 ppm or less, enabling the overall process to achieve a combined product having less than 10 ppm sulfur.

EXAMPLES

The flow schemes of FIG. 3 and FIG. 1 (without reactor 36) were simulated, and the results of the simulation are illustrated in Tables 1 and 2 below. The conditions in the simulations were adjusted to result in product streams having about 10 ppm S.

TABLE 1

Simulation Results for the Flow Scheme of FIG. 1

| | Stream | | |
|---|---|---|---|
| | 10 | 16 | 40 |
| Boiling Range | | | |
| 1% D86 (° F.) | 147 | 278 | 147 |
| 10% | 156 | 293 | 156 |
| 30% | 156 | 302 | 156 |
| 50% | 198 | 324 | 198 |
| 70% | 235 | 345 | 235 |
| 90% | 340 | 365 | 340 |
| 99% | 389 | 395 | 389 |
| Total S (ppm) | 530 | 672 | 10 |
| Br# | 68.5 | 56.4 | 49.6 |
| Density | 0.7857 | | 0.7857 |
| Flow (lb/h) | 728513 | 572623 | 728513 |
| RON loss | | | 3.2 |

TABLE 2

Simulation Results for the Flow Scheme of FIG. 3

| | Stream | | | |
|---|---|---|---|---|
| | 308 | 326 | 324 | 346 |
| Boiling Range | | | | |
| 1% D86 (° F.) | 147 | 174 | 278 | 147 |
| 10% | 156 | 190 | 293 | 156 |
| 30% | 156 | 198 | 302 | 156 |
| 50% | 198 | 209 | 324 | 198 |
| 70% | 235 | 223 | 345 | 235 |
| 90% | 340 | 250 | 365 | 340 |
| 99% | 389 | 274 | 395 | 389 |
| Total S (ppm) | 530 | 478 | 843 | 10 |
| Br# | 68.5 | 84 | 32 | 53.1 |
| Density | 0.7857 | 0.7773 | 0.8191 | 0.7857 |
| Flow (lb/h) | 728513 | 268680 | 303943 | 728513 |
| RON loss | | | | 2.5 |

As can be seen by comparing the results in the tables above, the process of FIG. 3 is more selective than the process of FIG. 1, resulting in less olefins loss and a higher product octane number. The tables also illustrate the synergies that may be attained in the heavy cracked naphtha distillation column reactor system, where stream 16 has a flow rate of about 572623 lb/h as compared to stream 324 having a flow rate of only 303943 lb/h.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for reducing the sulfur content of a hydrocarbon stream, the system comprising:
   a hydrogenation reactor for contacting a full range cracked naphtha with a hydrogenation catalyst to convert at least a portion of the dienes and mercaptans to thioethers and to hydrogenate at least a portion of the dienes;
   a separation system for fractionating the full range cracked naphtha into a light naphtha fraction and a heavy fraction;
   a separation system for, in the absence of catalyst, fractionating the heavy fraction into a medium naphtha fraction having a boiling range, end point temperature minus initial boiling point temperature, of less than 150° F., and a heavy naphtha fraction;
   a hydrodesulfurization reactor for hydrodesulfurizing the heavy naphtha fraction;
   a mixer for mixing the medium naphtha fraction with hydrogen and a gas oil to form a mixture;
   a hydrodesulfurization reactor for contacting the mixture with a hydrodesulfurization catalyst to produce a reactor effluent comprising hydrogen sulfide, unreacted hydrogen, and a medium naphtha fraction having a reduced sulfur concentration;
   a separation system for separating the medium naphtha fraction having a reduced sulfur concentration from the gas oil, the unreacted hydrogen, and hydrogen sulfide.

2. The system of claim 1, wherein the light naphtha fraction has a boiling range end point in the range from about 120° F. to about 190° F.

3. The system of claim 1, wherein the medium naphtha fraction has a boiling range, end point temperature minus initial boiling point temperature, of less than 150° F.

4. The system of claim 1, wherein the heavy naphtha fraction has an initial boiling point in the range from about 230° F. to about 270° F.

5. The system of claim 1, wherein a catalytic distillation reactor system is provided as both the hydrogenation reactor for the contacting the full range cracked naphtha and the separation system for fractionating the full range cracked naphtha into the light naphtha fraction and a heavy fraction concurrently.

6. The system of claim 5, further comprising a hydrogenation reactor for contacting hydrogen and the medium naphtha fraction with a hydrogenation catalyst.

7. The system of claim 1, wherein a volume ratio of the gas oil to the medium naphtha fraction is in the range from about 0.5:1 to about 5:1.

8. The system of claim 1, wherein the light naphtha fraction has a sulfur content of less than about 15 ppm, the medium naphtha fraction having a reduced sulfur concentration has a sulfur content of less than about 5 ppm, and the hydrodesulfurized heavy naphtha fraction has a sulfur content of less than about 12 ppm.

9. The system of claim 8, further comprising a mixer for mixing the light naphtha fraction, the medium naphtha fraction having a reduced sulfur concentration, and the hydrodesulfurized heavy naphtha fraction to produce a full range naphtha product having a sulfur content of equal to or less than about 10 ppm.

10. The system of claim 1, wherein the hydrodesulfurization reactor for hydrodesulfurizing the heavy naphtha fraction comprises:
   a catalytic distillation reactor system, having a first hydrodesulfurization reaction zone and a second hydrodesulfurization reaction zone, each containing a hydrodesulfurization catalyst, for concurrently:
      fractionating the heavy naphtha fraction into a light fraction and a heavy fraction;
      contacting the light fraction and hydrogen over the hydrodesulfurization catalyst in the first hydrodesulfurization zone to produce an overheads fraction comprising the light fraction having a reduced sulfur content, unreacted hydrogen, and hydrogen sulfide; and
      contacting the heavy fraction and hydrogen over the hydrodesulfurization catalyst in the second hydrodesulfurization zone to produce a bottoms fraction comprising the heavy fraction having a reduced sulfur content;

the system further comprising:
a separation system for separating unreacted hydrogen and hydrogen sulfide from the overheads fraction; and
a flow line for recovering the hydrodesulfurized heavy fraction as a mixture of the light fraction having a reduced sulfur content and the heavy fraction having a reduced sulfur content.

11. The system of claim 1, further comprising:
a flow line for using a portion of the heavy fraction as the gas oil;
a flow line for recovering separated gas oil from the separation system for separating the medium naphtha fraction having a reduced sulfur concentration from the gas oil, the unreacted hydrogen, and hydrogen sulfide and recycling a portion of the separated gas oil to the mixing step; and
a flow line for feeding at least a portion of the separated gas oil to the hydrodesulfurization reactor for hydrodesulfurizing the heavy naphtha fraction step as a purge.

12. The system of claim 1, wherein the hydrodesulfurization reactor for contacting the mixture is a downflow trickle bed reactor.

13. The system of claim 1, wherein the separation system for separating the medium naphtha fraction having a reduced sulfur concentration from the gas oil, the unreacted hydrogen, and hydrogen sulfide comprises:
a first separator receiving the reactor effluent, and producing a vapor fraction comprising unreacted hydrogen and a liquid fraction;
a fractionation column for receiving the liquid fraction, and producing an overheads stream comprising dissolved hydrogen and hydrogen sulfide and a bottoms stream comprising medium cracked naphtha and heavy cracked naphtha;
a flow line for purging the overhead stream from the system; and
a flow line for feeding the bottoms stream to a second fractionation column for recovering the medium cracked naphtha fraction having a boiling range, end point temperature minus initial boiling point temperature, of less than 150° F. and the heavy cracked naphtha fraction.

14. A system for reducing the sulfur content of a hydrocarbon stream, the system comprising:
a hydrogenation reactor for contacting a full range cracked naphtha with a hydrogenation catalyst to convert at least a portion of the dienes and mercaptans to thioethers and to hydrogenate at least a portion of the dienes;
a separation system for fractionating the full range cracked naphtha into: a light naphtha fraction having a boiling range end point in the range from about 140° F. to about 150° F. and a sulfur content of less than about 15 ppm, and a heavy fraction;
a separation system for, in the absence of catalyst, fractionating the heavy fraction into:
a medium naphtha fraction having initial boiling point in the range from about 140° F. to about 150° F. and a boiling range, end point temperature in the range from about 230° F. to about 270° F.; and
a heavy naphtha fraction having an initial boiling point in the range from about 230° F. to about 270° F.;
a hydrodesulfurization reactor for hydrodesulfurizing the heavy naphtha fraction to produce a hydrodesulfurized heavy naphtha fraction has a sulfur content of less than about 12 ppm;
a mixer for mixing the medium naphtha fraction with hydrogen and a gas oil to form a mixture;
a heater for heating the mixture;
a hydrodesulfurization reactor for contacting the heated mixture with a hydrodesulfurization catalyst to produce a reactor effluent comprising hydrogen sulfide, unreacted hydrogen, and a medium naphtha fraction having a reduced sulfur concentration;
a separation system for separating the medium naphtha fraction having a reduced sulfur concentration from the gas oil, the unreacted hydrogen, and hydrogen sulfide to produce a medium naphtha fraction having a reduced sulfur concentration has a sulfur content of less than about 5 ppm;
a mixer for mixing the light naphtha fraction, the medium naphtha fraction having a reduced sulfur concentration, and the hydrodesulfurized heavy naphtha fraction to produce a full range naphtha product having a sulfur content of equal to or less than about 10 ppm.

15. A system for reducing the sulfur content of a hydrocarbon stream, the system comprising:
a catalytic distillation reactor system for concurrently:
contacting a full range cracked naphtha with a hydrogenation catalyst to convert at least a portion of the dienes and mercaptans to thioethers and to hydrogenate at least a portion of the dienes;
fractionating the full range cracked naphtha into a light naphtha fraction and a heavy fraction at an overhead temperature of less than 165° F.;
a separation system for, in the absence of catalyst, fractionating the heavy fraction into a medium naphtha fraction having a boiling range, end point temperature minus initial boiling point temperature, of less than 105° F., and a heavy naphtha fraction;
a hydrodesulfurization reactor for hydrodesulfurizing the heavy naphtha fraction; a mixer for mixing the medium naphtha fraction with hydrogen and a gas oil to form a mixture;
a hydrodesulfurization reactor for contacting the mixture with a hydrodesulfurization catalyst to produce a reactor effluent comprising hydrogen sulfide, unreacted hydrogen, and a medium naphtha fraction having a reduced sulfur concentration;
a separation system for separating the medium naphtha fraction having a reduced sulfur concentration from the gas oil, the unreacted hydrogen, and hydrogen sulfide, wherein the medium naphtha fraction has a reduced sulfur concentration of less than about 5 ppm; and
a mixer for mixing the light naphtha fraction, the medium naphtha fraction having a reduced sulfur concentration, and the hydrodesulfurized heavy naphtha fraction to produce a full range naphtha product having a sulfur content of equal to or less than about 10 ppm.

* * * * *